United States Patent [19] [11] 4,102,794
Gandini et al. [45] Jul. 25, 1978

[54] FIREPROOFING MATERIALS

[75] Inventors: Giuseppe Gandini, Brescia; Luigi Frignoli, Milan, both of Italy

[73] Assignees: Luigi Frignoli, Brescia; Ermanno Savio, Milan; Sergio Calamani, Milan; Eugenio Turri, Milan, all of Italy

[21] Appl. No.: 817,213

[22] Filed: Jul. 20, 1977

[30] Foreign Application Priority Data

Jul. 21, 1976 [IT] Italy .............................. 25563 A/76
Sep. 17, 1976 [IT] Italy .............................. 27324 A/76

[51] Int. Cl.$^2$ ............................................. C09K 3/28
[52] U.S. Cl. .............................. 252/8.1; 106/15 FP; 428/921
[58] Field of Search ................... 252/8.1; 106/15 FP; 427/136; 428/921

[56] References Cited

U.S. PATENT DOCUMENTS 3,996,142 12/1976 White et al. .......................... 252/8.1
4,011,090 3/1977 Clarke et al. ..................... 252/8.1 X
4,012,558 3/1977 Wurman ............................ 252/8.1 X Primary Examiner—Stephen J. Lechert, Jr.
Attorney, Agent, or Firm—Oblon, Fisher, Spivak, McClelland & Maier

[57] ABSTRACT

A composition is disclosed for fireproofing materials of various kind, comprising an aqueous solution containing in the solution at least three ions selected from the group including ammonium, zinc, bromine, chlorine ions, alkaline-earth metal ions and phosphate ions. This aqueous solution is acidified to pH up to 1.

10 Claims, No Drawings

FIREPROOFING MATERIALS

This invention relates to a composition, more particularly an aqueous solution of inorganic salts, by means of which materials of various kind can be fireproofed.

It is well known that inflammability of many materials, such as wood, paper, cardboard, cotton, wool, synthetic fibers, fabrics, carpets, etc., represents a serious risk for persons and things. Since long ago attempts have been made to fireproof these materials by treating the same with chemical substances, but so far the results have not been satisfactory due to the following reasons.

First, hitherto known compositions can be effectively used only on one kind of material (for example, only on wood or only on a definite type of synthetic fiber), or on like materials; or such compositions are highly expensive and, therefore, substantially unusable; or further require very complex, long or expensive procedures for application thereof to the materials to be processed; finally, known fireproof compositions would often considerably deteriorate the outward appearance of treated materials, or would themselves be dangerous because of generating strongly irritating and toxic gases on flame contact.

It is well known that when treating wood and its derivatives with ammonium phosphates and/or ammonium chloride, such materials are fireproofed, but it is also well known that these ammonium salts rapidly lead to formations of moulds and fungi, darkening the surfaces of treated materials, whereby the latter are unusable for most of the intended uses thereof.

The use of ammonium phosphates and chlorides, as applied by rather complicated procedures or together with other expensive materials, in order to overcome the above mentioned disadvantages, is disclosed, for example, in U.S. Pat. No. 3,935,343, U.S. Pat. No. 3,840,388, in Japanese Published Patent Applications Japan Kokai 73 56,291 and 75 19,909, in Polish Patent No. 60,535, and in Spanish Patent No. 394,288.

For wood fireproofing, the use is also known of phosphates along with materials of expensive various kind, seriously alternating the appearance of the materials treated thereby, as is disclosed in German Patent Applications DOS 2,146,381 and DOS 2,146,382 and in French Published Patent Application No. 2,119,831. U.S. Pat. No. 3,639,232 teaches that nylon can be fireproofed by treatment with ammonium chloride together with methylolated urea and thiourea.

According to teachings set forth in German Published Patent Applications DOS No. 2,300,874, DOS No. 2,363,097, DOS No. 2,340,288, DOS No. 2,325,877 and DOS No. 2,205,213, French Published Patent Application No. 2,013,851 and Japanese Published Patent Application Japan Kokai 75 24,408, wood can be fireproofed when treated with calcium chloride or magnesium chloride. However, these two salts are highly absorbent of humidity and the materials thereby treated are perennially very damp (and accordingly are unusable for most uses), unless using with such chlorides also other materials that are either costly or scarcely effective, as taught by some of the above mentioned patents.

U.S. Pat. No. 3,687,720 and German Patent Application DOS 1,813,021 teach that rayon and respectively cellulose containing textiles can be fireproofed by treatment with solutions of zinc chloride along with other highly complex and expensive salts: these further salts are required since the appearance of treated materials would be otherwise unacceptable, particularly because of being very damp.

A method is described in Text. Res. J., 1972, 42(9), 533-5 (Eng) for wool fireproofing by treatment with haloorganic aliphatic acidic halides in DMF, these products being rather costly.

Finally, the use of really highly complex and expensive fireproof compositions is disclosed in many patents, such as British Pat. Nos. 1,174,866, 1,325,806 and 1,328,394, U.S. Pat. Nos. 3,629,559, 3,758,554 and 3,765,837, German Patent Applications DOS Nos. 2,137,356, DOS 2,118,224, DOS 2,307,744 and DOS 2,319,449, Japanese Published Patent Applications Nos. 71 18,318, 73 12,470, 73 30,880, 73 30,879 and 73 23,299 and many other: many of the components of these compositions are of the tetrakis (hydroxymethyl) phosphonium hydroxide type, or of the tetrakis (hydroxymethyl) phosphonium chloride type or the like.

When examining the very abundant existing literature about the matter subject of the present invention, it will be seen that attempts have been made for the single use of economical and not dangerous compounds, such as ammonium chloride, zinc chloride and calcium chloride, but which cannot be practically used alone, either because of being greatly hygroscopical (such as calcium and zinc chlorides), or of yellowing or darkening the processed materials, as it occurs when using ammonium chloride. In order to be freed of the above relevant disadvantages, these compounds have been accordingly employed with other compounds, or very costly, or toxic, or of such a nature that the appearance of the processed materials was seriously deteriorated. Additionally, no economical method was found for fireproofing the majority of the materials.

It is the primary object of the present invention to provide a low cost composition, the components of which are selected among a limited number of chemical materials, which composition is highly economical, of ready use, low toxicity or riskiness, by means of which most of natural or synthetic materials can be substantially fireproofed, without any significant alteration to the outward appearance thereof.

These and still other objects are achieved by a liquid composition comprising an aqueous solution having therein at least three ions selected from the group comprising ammonium, zinc, bromine, chlorine ions, alkaline-earth metal ions and phosphate ions.

In practice, in order to fireproof most of the materials of an organic or synthetic nature, it would be sufficient to treat such materials with an aqueous solution having dissolved therein one or several salts as selected among ammonium, zinc and alkaline-earth metal chlorides or bromides, and also among ammonium phosphates, and one acid.

The number of the chemical substances set forth above is rather limited, and accordingly some tests can be easily and readily effected to determine which of such substances are to be used for preparing a processing aqueous solution, by means of which the desired material can be fireproofed.

The unique feature provided by the combination of said substances or materials is that the material treated with said solution is perfectly dry, not rigid, excellent in appearance, inalterable in time, besides being fireproof, of course.

To this purpose and in order to make ideas clearer, it should be noted that while wood and cotton treated with zinc chloride become and remain very damp, and become yellow or dark when treated with ammonium chloride, said materials remain substantially unaltered and dry when treated with an aqueous solution containing both dissolved salts; similarly, paper and cardboard retain an excellent appearance after treatment with solutions containing ammonium chlorides along with zinc and calcium or magnesium chlorides.

In order that the features of the present invention be more clearly understood, a description will now be given for some examples of preparing aqueous solutions, by means of which materials of various kind can be fireproofed.

For the sake of brevity, it is herein specified that the materials to be processed can be immersed for some minutes (generally a very few minutes are sufficient) in the relevant solutions, or, if desired, such materials can be simply sprayed with such solutions, or can also be wetted with said solutions in any other manner, for example by means of a sponge impregnated in the solution.

EXAMPLE 1

40 g zinc chloride and 100 g ammonium chloride were dissolved in 1 liter water and 20 drops of phosphoric acid were added. By means of a sponge, a small board of poplar wood was twice wetted with such a solution, and after being allowed to dry, said small board was fireproof and could be painted as if it had not been treated.

EXAMPLE 2

108 g ammonium chloride, 36 g zinc chloride and 40 g calcium chloride were dissolved in 1 liter water and 20 drops of phosphoric acid were added. A small wood board was immersed in this solution for 10 minutes which, after withdrawing from the solution and drying, was of excellent appearance and fireproof.

EXAMPLE 3

100 g ammonium chloride and 80 g zinc chloride were dissolved in 1 liter water to provide a solution for wood treatment, as above specified.

EXAMPLE 4

48 g ammonium chloride and 80 g calcium chloride were dissolved in 1 liter water to provide a solution for wood treatment.

For wood treatment, it was found that solutions containing chlorine ions and calcium ions are much more effective than those containing bromine ions and magnesium ions, which should accordingly not be used to this purpose.

EXAMPLE 5

80 g ammonium chloride, 40 g zinc chloride and 40 g magnesium chloride were dissolved in 1 liter water to provide a solution by which white paper of good grade, on which it is possible to write or print as conventional, can be fireproofed, while retaining an excellent outward appearance.

EXAMPLE 6

32 g ammonium chloride, 32 g zinc chloride and 80 g calcium chloride were dissolved in 1 liter water. A solution was provided, in which cardboard sheets can be immersed for some minutes which, after drying, retain an excellent appearance and are fireproof.

EXAMPLE 7

108 g ammonium bromide, 36 g zinc chloride and 40 g calcium bromide were dissolved in 1 liter water. The solution thus obtained is suitable for cardboard treatment, imparting thereto characteristics of fireproofing and retaining an excellent outward appearance thereon.

EXAMPLE 8

80 g zinc chloride and 80 g calcium chloride were dissolved in 1 liter water to provide a solution for fireproof treatment of cardboard.

EXAMPLE 9

100 g ammonium bromide and 40 g zinc chloride were dissolved in 1 liter water, and 20 drops of phosphoric acid were added. In the solution thus obtained, paper wall tapestry of non-washable type was immersed for 5 minutes, after drying the paper being unaltered and fireproofed.

EXAMPLE 10

100 g ammonium chloride and 100 g zinc chloride were dissolved in 1 liter water to provide a solution for non-washable type of paper wall tapestry.

EXAMPLE 11

100 g ammonium chloride and 40 g zinc chloride were dissolved in 1 liter water and 20 drops of phosphoric acid were added thereto. A washable type of paper wall tapestry could be immersed for a few minutes in this solution, which after drying was of unaltered appearance and fireproof.

EXAMPLE 12

100 g ammonium chloride and 140 g zinc chloride were dissolved in 1 liter water. A solution was provided, in which a wall tapestry made of plasticized paper on its face surface was immersed for 5 minutes. Once dried, this tapestry of the unaltered appearance and fireproof.

EXAMPLE 13

48 g ammonium chloride, 20 g zinc chloride and 80 g calcium chloride were dissolved in 1 liter water. In this solution a wall tapestry made of plastics material and having a thin layer of paper on its underside was immersed for a few minutes. After drying, this tapestry was fireproof and of excellent appearance.

EXAMPLE 14

For cotton fireproofing, while allowing it to retain an excellent appearance after drying, a cotton knitted fabric was provided and immersed for a few minutes in a solution, of which some exemplary compositions are given herein below, then the fabric was allowed to dry.

Composition A: 60 g ammonium chloride and 40 g zinc chloride were dissolved in 1 liter water.
Composition B: 40 g ammonium bromide and 120 zinc chloride were dissolved in 1 liter water.
Composition C: 100 g zinc chloride were dissolved in 1 liter water and 60 drops of phosphoric acid were added.
Composition D: 80 g ammonium bromide, 40 g zinc chloride and 40 g magnesium chloride were dissolved in 1 liter water.

As to cotton, it was found that where only two salts were dissolved together in water, such salts should comprise ammonium and zinc salts.

EXAMPLE 15

For fireproofing of a wool knitted fabric, such a fabric was provided and immersed for 10 minutes in a solution, such as one of those herein below specified and as given by mere way of example. After drying, the wool fabric retained an excellent appearance and was fireproof.

Composition A: 108 g ammonium chloride, 36 g zinc chloride and 40 g calcium chloride were dissolved in 1 liter water, and 20 drops of phosphoric acid were added.

Composition B: 100 g ammonium bromide and 40 g zinc chloride were dissolved in 1 liter water, and 20 drops of phosphoric acid were added.

Composition C: 80 g ammonium bromide, 40 g zinc chloride and 40 g magnesium chloride were dissolved in 1 liter water.

Composition D: 40 g ammonium chloride and 120 g zinc chloride were dissolved in 1 liter water.

Composition E: 60 g zinc chloride and 120 g calcium chloride were dissolved in 1 liter water.

EXAMPLE 16

For fireproofing, a nylon fabric was immersed in or sprayed with a solution, of which some unrestrictive examples are given herein below. After drying, the nylon fabric was fireproof and of excellent appearance.

Composition A: 100 g ammonium bromide and 40 g zinc chloride were in 1 liter water, and 20 drops of phosphoric acid were added.

Composition B: 108 g ammonium bromide, 36 g zinc chloride and 40 g calcium bromide were dissolved in 1 liter water.

Composition C: 100 g ammonium chloride, 40 g zinc chloride and 32 g calcium chloride were dissolved in 1 liter water.

EXAMPLE 17

A fabric of acylic fiber was fireproofed by immersion (and successive drying) in a solution, such as those hereinafter exemplified.

Composition A: 100 g ammonium bromide and 40 g zinc chloride were dissolved in 1 liter water, and 20 drops of phosphoric acid were added.

Composition B: 108 g ammonium bromide, 36 g zinc chloride and 40 g calcium bromide were dissolved in 1 liter water.

Composition C: 100 g ammonium chloride, 40 g zinc chloride and 60 g calcium chloride were dissolved in 1 liter water.

It was found that the solutions that can be used for treating acrylic fibers should be solutions of three or more salts, or of two salts with the addition of one acid.

EXAMPLE 18

A fabric of polyester fibers was fireproofed by immersion in or spraying with a solution, such as those specified in the following by way of not limitation.

Composition A: 100 g ammonium bromide and 40 g zinc chloride were dissolved in 1 liter water, and 20 drops of acid were added.

Composition B: 80 g ammonium bromide, 40 g zinc chloride and 40 g magnesium chloride were dissolved in 1 liter water.

Composition C: 40 g ammonium chloride and 120 zinc chloride were dissolved in 1 liter water, and in the case 20 drops of phosphoric acid can be added thereto.

Composition D: 40 g ammonium bromide and 120 g zinc chloride were dissolved in 1 liter water.

Composition E: 100 g zinc chloride were dissolved in 1 liter water and 20 drops of phosphoric acid were added thereto.

As to polyester fibers, it was found that in case where only two salts were dissolved together in water, such salts should comprise ammonium and zinc salts.

EXAMPLE 19

A moquette for floor lining, comprising a "Velours" having 80% acrylic fiber and 20% nylon and weighing 650 g/m$^2$, was fireproofed by immersion in or thorough spraying with a solution, such as those hereinafter specified by way of not limitation.

Composition A: 40 g ammonium chloride and 120 zinc chloride were dissolved in 1 liter water, and 20 drops of phosphoric acid were added thereto.

Composition B: 80 g ammonium chloride, 80 g zinc chloride and 40 g calcium chloride were dissolved in 1 liter water.

EXAMPLE 20

A moquette for carpet lining, comprising 100% wool and weighing 950 g/m$^2$, was fireproofed by wetting (and then drying) it with a solution, such as those hereinafter specified by way of unrestrictive example.

Composition A: 100 g zinc chloride were dissolved in 1 liter water and 60 drops of phosphoric acid were added thereto.

Composition B: 32 g ammonium chloride and 40 g zinc chloride were dissolved in 1 liter water.

Composition C: 32 g ammonium chloride, 32 g zinc chloride and 80 g calcium chloride were dissolved in 1 liter water.

Composition D: 32 g ammonium chloride and 40 g zinc chloride were dissolved in 1 liter water and 20 drops of phosphoric acid were added thereto.

Composition E: 80 g ammonium chloride and 80 g calcium chloride were dissolved in 1 liter water.

Composition F: 40 g ammonium bromide and 120 g zinc chloride were dissolved in 1 liter water.

Composition G: 100 g ammonium bromide and 40 g zinc chloride were dissolved in 1 liter water, and 20 drops of phosphoric acid were added thereto.

EXAMPLE 21

A moquette for floor lining, made of 100% nylon 66 polyamide and weighing 400 g/m$^2$, was fireproofed by immersing for a few minutes (and then drying) it in a solution, such as those hereinafter specified by way of unrestrictive example.

Composition A: 100 g ammonium chloride, 48 g zinc chloride and 20 g calcium chloride were dissolved in 1 liter water, and 20 drops of phosphoric acid were added thereto.

Composition B: 100 g ammonium chloride and 40 g zinc chloride were dissolved in 1 liter water, and 20 drops of phosphoric acid were added thereto.

Composition C: 100 g ammonium chloride, 40 g zinc chloride and 60 g calcium chloride were dissolved in 1 liter water.

After drying, the moquette was heated to 80° C for 1 hour.

EXAMPLE 22

A common powder or flake glue or paste of the type as ordinarily used for wall fixing of paper, fabric or plastic material tapestries, instead of being dissolved in pure water as now carried out, was dissolved in water containing (for each liter of water) 36 g ammonium chloride, 32 g zinc chloride and 80 g calcium chloride. After drying, the glue or paste, suitable for steadily and perfectly fixing the tapestry to a wall, was fireproof (while being highly inflammable when dissolved in pure water.

What we claim is:

1. A composition for fireproofing materials of various kind, consisting of an aqueous solution containing in the solution at least three ions selected from the group including ammonium, zinc, bromine, chlorine ions, alkaline-earth metal ions and phosphate ions.

2. A composition according to claim 1, wherein said aqueous solution is acidified.

3. The composition of claim 1, wherein said solution is prepared by dissolving into an aqueous residue a combination of ammonia, zinc and alkaline-earth metal chlorides, or bromides.

4. The composition of claim 1, wherein $NH_4^+$ and $PO_4^-$ are introduced into the solution in the form of ammonium phosphate.

5. The composition of claim 1, which comprises the combination of zinc chloride, ammonium chloride, phosphoric acid and water.

6. The composition of claim 1, which comprises the combination of ammonium chloride, zinc chloride and calcium chloride.

7. The composition of claim 1, which comprises the combination of ammonium chloride and zinc chloride.

8. The composition of claim 1, which comprises the combination of ammonium chloride, zinc chloride and magnesium chloride.

9. The composition of claim 1, which comprises the combination of ammonium bromide, zinc chloride and calcium bromide.

10. The composition of claim 1, which comprises the combination of ammonium bromide and zinc chloride.

* * * * *